March 7, 1950     J. W. SEAMANS     2,499,685
ELECTROMAGNETIC LIFTING DEVICE

Filed Jan. 22, 1946     2 Sheets—Sheet 1

INVENTOR.
James W. Seamans
BY Edward C. Healy
ATTORNEY

March 7, 1950  J. W. SEAMANS  2,499,685
ELECTROMAGNETIC LIFTING DEVICE
Filed Jan. 22, 1946  2 Sheets-Sheet 2

INVENTOR.
James W. Seamans
BY
ATTORNEY

Patented Mar. 7, 1950

2,499,685

UNITED STATES PATENT OFFICE 2,499,685

ELECTROMAGNETIC LIFTING DEVICE

James W. Seamans, San Leandro, Calif.

Application January 22, 1946, Serial No. 642,710

1 Claim. (Cl. 294—65.5)

This invention relates to a device for handling metal plates and has particular reference to use of electromagnets that serve to grip one of the metal plates to position it adjacent a second plate for the purpose of completing a weld.

The principal object of the invention is the production of an appliance equipped with means to accomplish an easy and positive manipulation of the plates to properly align the same prior to the welding operation.

A further object of the invention is the production of an appliance of the character described that is simple in construction, economical to manufacture, strong, durable, positive in operation and highly serviceable in use.

Other objects and advantages will be apparent during the course of the following description.

Figure 1:
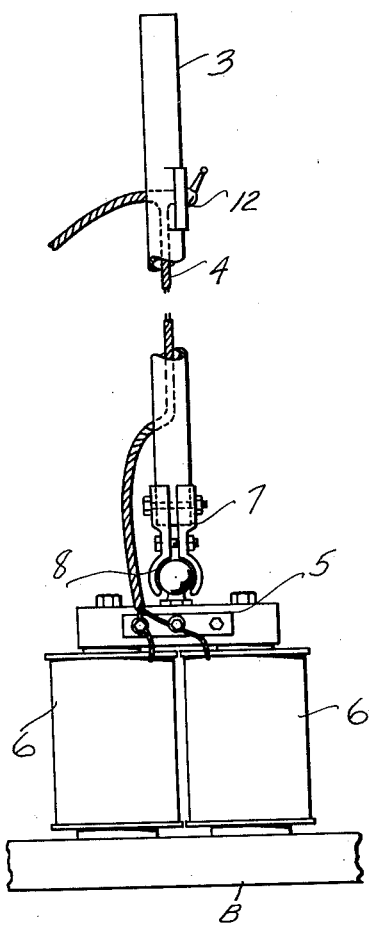
Figure 2:
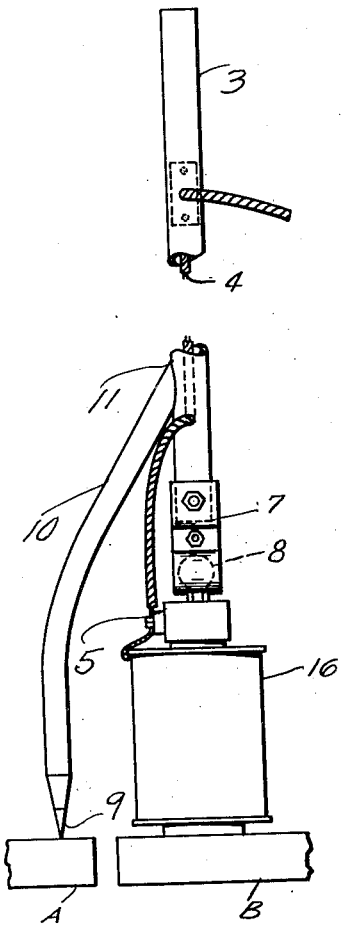
Figure 3:
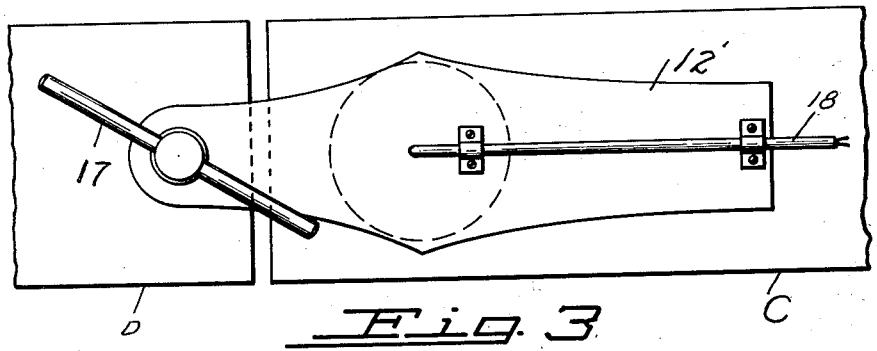
Figure 4:
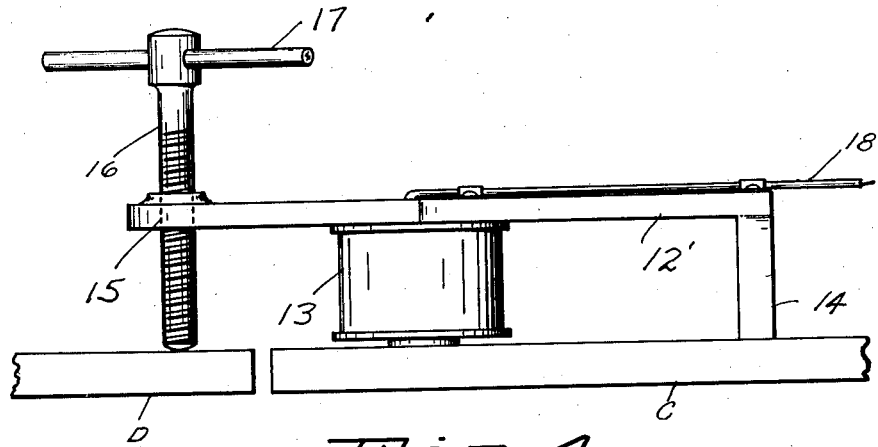

In the accompanying drawing forming a part of this specification and in which like numerals are employed to designate like parts throughout the same, Fig. 1 is a front elevational view of the device constructed in accordance with my invention, Fig. 2 is a side elevational view of the same, Fig. 3 is a top plan view of a modified form of the invention, and Fig. 4 is a side elevational view of the same.

It is customary to align sheets of metal with their longitudinal edges in position and to retain the same so positioned so that the welding operation can be completed to weld the two sheets. When a hand method is employed to align the sheets it is a most difficult and laborious task. To therefore introduce to the trade a type of magnetic lifting device that is most effective in operation, and wherein bottom or base plates, overhead and side plates, may be quickly and satisfactorily aligned, I have devised the present invention.

In the accompanying drawing wherein for the purpose of illustration is shown the preferred and modified forms of my invention the numeral 3 indicates a tubular handle through which an electric cord 4 is trained, the lower end of the cord being connected to a terminal block 5 that carries a pair of electromagnets 6.

Interposed between the terminal block 5 and the lower end 7 of the tubular handle, is ball and socket joint 8 that allows freedom of movement of the electromagnets. As disclosed to advantage in Fig. 2, the reference characters A and B designate a pair of plates which are to be aligned for the desired welding operation. It will be observed that while the electromagnets rest on the plate B for the purpose of pulling the same under the influence of the electromagnets to a position in alignment with the plate A, the steel point 9 of a bent bar 10 contacts the plate A. The opposite end of the rod or bar is welded or otherwise secured as at 11 to the tubular handle 3. The bar 10 accordingly accomplishes the desired pushing or pressure operation on the plate A. I propose to employ a toggle switch 12 that is embodied in the handle and controls the action of the electromagnets relative to the plate B.

In the modified form of the invention the reference characters D and C designate a pair of plates to be aligned. Instead of employing the construction illustrated in Figs. 1 and 2, a horizontal platform or plate 12' is utilized to support a single electromagnet 13. The said platform has integrally formed therewith and on one end thereof a vertical leg 14 capable of contacting the plate C. It will be noted that said platform has an internally threaded bore 15 formed in the opposite end thereof that threadedly receives a threaded shaft 16 capable of being rotated through the medium of an operating handle 17. The said shaft functions to apply pressure to the plate D to align the same with the plate C, prior to the welding operation. This shaft also performs the same function as does the bent bar 10, illustrated in Figs. 1 and 2.

Instead of training the wire through the tubular handle as disclosed in Figs. 1 and 2, said wire 18 is connected to the single electromagnet 13. The means for breaking the contact of the electromagnet with the plate C may be controlled from a remote point. It will be obvious from this construction that the plate C, under the influence of the electromagnet 13 can be readily lifted to a position in alignment with the plate D, and when the plates are aligned as illustrated the necessary welding operation can be completed.

It is to be understood that the forms of my invention herewith shown and described are to be taken as preferred examples of the same and that various changes relative to the material, size, shape and arrangement of parts may be resorted to without departing from the spirit of the invention or the scope of the subjoined claim.

Having thus described my invention, I claim:

A device for lifting a metal plate or the like to align the same with an adjacent plate embodying in its construction a tubular handle portion for receiving therein a line wire, a toggle switch connected to said handle and the line wire, a pair of bracket arms secured to the lower end of said handle and defining a socket, a ball for the socket, the ball and socket defining a ball and socket joint, a pair of electromagnets carried by said joint and positioned on one of said plates, and means connected to said handle portion for exerting pressure on the adjacent plate, said means comprising a bent rod welded at its upper end to said handle and terminating at its opposite end in a pointed extremity.

JAMES W. SEAMANS.

REFERENCES CITED

The following references are of record in the file of this patent:

UNITED STATES PATENTS

| Number | Name | Date |
| --- | --- | --- |
| 621,267 | Monell | Mar. 14, 1899 |
| 710,041 | Clark | Sept. 30, 1902 |
| 1,047,954 | Krohne | Dec. 24, 1912 |
| 2,379,596 | Seamans | July 3, 1945 |